US007658602B2

(12) United States Patent
Fornaguera (10) Patent No.: US 7,658,602 B2
(45) Date of Patent: Feb. 9, 2010

(54) APPARATUS FOR FORMING A CENTER-FILLED CONFECTIONERY AND METHOD

(75) Inventor: Joan Fabre Fornaguera, Sant Cugat del Valles (ES)

(73) Assignee: Wm. Wrigley Jr. Company, Chicago, IL (US)

( * ) Notice: Subject to any disclaimer, the term of this patent is extended or adjusted under 35 U.S.C. 154(b) by 536 days.

(21) Appl. No.: 11/556,428

(22) Filed: Nov. 3, 2006

(65) Prior Publication Data

US 2007/0104830 A1 May 10, 2007

Related U.S. Application Data

(60) Provisional application No. 60/733,517, filed on Nov. 4, 2005, provisional application No. 60/821,373, filed on Aug. 3, 2006.

(51) Int. Cl.
*A23G 3/12* (2006.01)
(52) U.S. Cl. .................. 425/235; 425/237; 425/357; 425/362; 425/365
(58) Field of Classification Search ............ 425/235, 425/237, 327, 357, 362, 363, 365, 374, 335, 425/395
See application file for complete search history.

(56) References Cited

U.S. PATENT DOCUMENTS

| 1,920,445 | A | * | 8/1933 | Thurlings | 425/235 |
| 1,967,565 | A | * | 7/1934 | Thurlings | 425/235 |
| 2,297,244 | A | * | 9/1942 | Pfahl | 425/365 |
| 4,003,686 | A | * | 1/1977 | McLeod et al. | 425/362 |
| 4,025,270 | A | * | 5/1977 | Beckers | 425/297 |
| 4,253,815 | A | * | 3/1981 | Beckers et al. | 425/235 |
| 4,798,529 | A | * | 1/1989 | Klinner | 425/362 |
| 5,125,819 | A | | 6/1992 | Hager et al. | |
| 5,449,281 | A | * | 9/1995 | Dupart et al. | 425/237 |
| 6,251,454 | B1 | | 6/2001 | Layfield | |
| 6,280,780 | B1 | | 8/2001 | Degady et al. | |
| 6,284,291 | B1 | | 9/2001 | Siecke et al. | |
| 6,472,001 | B1 | | 10/2002 | Bunkers et al. | |
| 6,558,727 | B2 | | 5/2003 | Degady et al. | |
| 6,838,098 | B2 | | 1/2005 | Bunkers et al. | |

FOREIGN PATENT DOCUMENTS

| DE | 25 23 836 | 8/1976 |
| DE | 100 35 461 | 2/2002 |
| EP | 1 151 673 | 11/2001 |
| JP | 1951-5888 | 9/1951 |

OTHER PUBLICATIONS

Trident Splash Product Label.
Gumlink Annual Report 2005, www.gumlink.com, (20 pp.).

* cited by examiner

*Primary Examiner*—James Mackey
(74) *Attorney, Agent, or Firm*—K&L Gates LLP (57) ABSTRACT

The present disclosure provides an apparatus and method for the continuous production of center-filled confectionery products. The apparatus may include an extruder for forming a continuous extrudate having a plurality of center-filled confectionery ropes. The apparatus may also include a forming device for forming individual confectionery pieces, and sealed center-filled confectionery pieces in particular. The forming device provides improved coordination and control of extrudate formation and extrudate feed into the forming device. The apparatus and method of the present disclosure increases product output and reduces the amount of unacceptable product.

7 Claims, 8 Drawing Sheets

APPARATUS FOR FORMING A CENTER-FILLED CONFECTIONERY AND METHOD

PRIORITY CLAIM

This application claims priority to U.S. patent application Ser. No. 60/733,517 filed on Nov. 4, 2005 and U.S. patent application Ser. No. 60/821,373 filed on Aug. 3, 2006, the entire content of each application incorporated herein.

BACKGROUND

Liquid or center-filled gum and other center-filled confectionery products enjoy widespread popular appeal. These products typically exhibit a soft, chewy or pliable outer portion that surrounds a flavored liquid or syrup center portion. The filled candy is often coated with a hard or a soft candy shell.

A problem encountered in the large scale production of such candies is the inability to adequately control and coordinate the flow rate of the center-fill material and/or the confectionery extrudate with the individual piece forming process. Poor control and coordination of these process parameters results in improperly sealed center-fill confectionery pieces. Improperly sealed pieces are particularly troublesome as unsealed confectionery pieces leak a sticky, viscous fluid onto acceptable product pieces and/or production equipment. Thus, leaked fill material deleteriously impacts otherwise acceptable confectionery pieces, contributes to material waste, and causes equipment stoppage. Moreover, conventional center-fill production systems based on single rope extrusions are inherently limited in product output.

A need exists for an apparatus and method for controlling and coordinating the extrusion process and the piece forming process, particularly in large scale production systems for center-filled confectioneries. A need further exists for a production system that overcomes the limitations of single rope extrusion systems.

SUMMARY

The present disclosure sets forth apparatuses and methods for the continuous production of center-filled confectionery products. The apparatuses and methods set forth herein may increase product output while providing improved control of process parameters such as extrusion, center-fill extrusion, and/or coordination between extrudate formation and the formation of final individual pieces. These improvements reduce the amount of unacceptable product and reduce system and equipment downtime. The present disclosure also sets forth a multiple rope extrusion system that overcomes the output limitations of single rope extrusion.

In an embodiment, an apparatus for producing a center-filled confectionery product is provided. The apparatus includes an extruder for forming a continuous extrudate, the extrudate having a plurality of center-filled confectionery ropes and a forming device. The forming device includes first and second forming members that may be positioned on opposing sides of the extrudate. The forming members are constructed and arranged so as to cooperatively engage the extrudate to form a sealed center-filled confectionery component.

In an embodiment, the extrudate may be an integral extrudate whereby the plurality of center-filled confectionery ropes are adjoined or connected to each other to form a single uniform extrudate. Similarly, the sealed center-filled confectionery component may include a web of adjoined sealed center-filled confectionery pieces. In an embodiment, the apparatus may include a separating device for separating the web into a plurality of discrete or separate sealed center-filled individual confectionery products.

In an embodiment, the extrudate may further include a fill material that is encased or otherwise surrounded in an outer confectionery material. In a further embodiment, the fill material may be a liquid and the outer confectionery material may be a chewing gum. In an embodiment, each sealed center-filled individual confectionery piece may include a peripheral flange that extends around an outer perimeter of the confectionery piece. In an embodiment, the peripheral flange may include only the outer confectionery material and be substantially free of the fill material. In a further embodiment, the fill material may be cooled prior to extrudate formation in order to cool the extrudate from the inside. The fill material may have a temperature of from about 1° C. to about 10° C.

In an embodiment, the apparatus may include a transport device for receiving the continuous extrudate. The transport device may be used to deliver the extrudate to the forming device.

In an embodiment, at least one forming member may include an orifice for an air jet. The air jet may be used to discharge or eject the center-filled confectionery component from the forming member. The forming members may be cooled to assist in removal of the finished product therefrom. In an embodiment, at least one forming member may have a temperature from about 0° C. to about 20° C.

In an embodiment, the first forming member may be disposed on an outer surface of a first rotating drum and the second forming member may be disposed on an outer surface of a second rotating drum. The first and second rotating drums may oppose each other and rotate to cooperatively engage or mate the first forming member with the second forming member thereby forming the separate center-filled confectionery pieces.

In an embodiment, the first forming member may disposed on (or may be a component of) a cutting device and the second forming member may be disposed on an outer surface of a rotating drum. The cutting device may be moveable between a first position and a second position, namely an idle position and a cutting position. The cutting device may be positioned above the rotating drum, with the cutting device movable in an up-and-down manner between the first and second positions. To assist in final product removal, the cutting device and/or the rotating drum may be cooled and may have a temperature from about 0° C. to about 20° C.

In an embodiment, the apparatus may include a coating device for coating the sealed center-filled confectionery component with a coating material. The coating may be a hard shell or a soft shell coating. The coating may be applied to the web of adjoined sealed confectionery pieces, or to each sealed center-filled individual confectionery piece.

In an embodiment, a method for producing a center-filled confectionery product is provided. The method includes extruding an extrudate having a plurality of adjoined center-filled confectionery ropes, and forming the extrudate into a sealed center-filled confectionery component with a forming device. The method may further include passing the extrudate between a first forming member and a second forming member and cooperatively engaging, mating, or registering the forming members to form the sealed confectionery component. In an embodiment, the extruding may occur at a rate from about 2 m/min to about 20 m/min.

In an embodiment, the forming may include crimping and subsequently cutting the extrudate. The method may include cooling the forming members to a temperature from about 0° C. to about 20° C. to assist in product discharge from the forming device.

In an embodiment, the sealed center-filled confectionery component may be a web of adjoined sealed center-filled confectionery pieces and the method may include separating the web into a plurality of discrete center-filled individual confectionery pieces.

In an embodiment, the method may include filling each of the plurality of confectionery ropes with a fill material. The fill material may be cooled prior to the filling step to assist in cooling the extrudate.

In an embodiment, formation of the sealed center-filled confectionery component may be coordinated with the filling of the confectionery ropes with fill material. For example, the fill material may be intermittently pumped into each confectionery rope during either the crimping and/or cutting step of product formation. This coordination may prevent a backflow of fill material into the conduits during the cutting.

In an embodiment, the method may include coating the sealed center-filled confectionery component with a coating material. The coating may be applied to the center-filled confectionery component, the web of adjoined sealed confectionery pieces and/or each sealed center-filled individual confectionery piece.

In an embodiment, an apparatus for producing a center-filled extrudate is provided. The apparatus includes a manifold having a passageway. A plurality of annular conduits extend through the passageway, with each conduit having a discharge end. The apparatus includes an exit port having an orifice in fluid communication with the passageway and the conduit ends may be disposed in a spaced apart manner within the orifice.

In an embodiment, the conduit discharge ends may be disposed in a linear arrangement in the orifice. The orifice may further include a plurality of wide portions corresponding to the plurality of annular conduits. The orifice may also include a plurality of narrow portions separating the wide portions. In a further embodiment, the apparatus may include from about 2 to about 20 annular conduits.

The passageway may be adapted to receive a fluid confectionery and the annular conduits may be adapted to receive a flowable fill material. The fluid confectionery may surround each conduit discharge end to form an extrudate having a plurality of center-filled confectionery ropes upon exit from the orifice. The number of ropes may correspond to the number of conduits. Each confectionery rope may include an outer portion of the fluid confectionery and an inner portion of the fill material. The diameter of the ropes may be substantially similar in length.

In an embodiment, the extrudate may include a strand portion of the fluid confectionery. The strand portion may be disposed between adjacent confectionery ropes with the strand portion adjoining adjacent center-filled confectionery ropes.

In an embodiment, the manifold passageway may include a bend. The apparatus may also include a flow regulator in fluid communication with an inlet end of each conduit for dispensing fill material into each confectionery rope. In an embodiment, the flow regulator may be used to intermittently pump the fill material through the plurality of conduits and into the ropes. In yet a further embodiment, the fill material may be cooled to a temperature from about 1° C. to about 15° C. to assist cooling the extrudate.

In an embodiment, a method for producing a center-filled extrudate is provided. The method includes extruding a plurality of adjoined fluid confectionery ropes and coextruding a fill material into each confectionery rope. This forms an extrudate having a plurality of adjoined center-filled confectionery ropes. The confectionery ropes may be disposed in a substantially linear arrangement as a result of fill material coextruded from a plurality of spaced apart linearly disposed conduits. In an embodiment, the extruding and the coextruding may occur simultaneously or substantially simultaneously. The extruding and the coextruding may also occur at a common exit port.

In an embodiment, the extruding may include forming with the fluid confectionery an annular confectionery rope. The center-fill material may be concentrically coextruded within the fluid confectionery ropes. In a further embodiment, the method may include forming the confectionery ropes from a single flow of a fluid confectionery material. The extrusion flow rate may be about 2 m/min to about 20 m/min for the fluid confectionery material and/or the fill material.

In an embodiment, the method may include cooling the center-fill material to a temperature from about 1° C. to about 15° C. The flow rate of the fill material may be regulated upon introduction into the confectionery ropes. In an embodiment, the fill material may be intermittently coextruded into the confectionery ropes.

In an embodiment, a forming device is provided. The forming device may include a pair of opposing rotating drums, the drums having cooperatively engageable forming members. Each drum may also have a first drum portion and a second drum portion. The first drum portion and the second drum portion each may have an adjustable rotation rate. The rotation rate of each drum portion may be adjusted independent of the other drum portion. In an embodiment, the first drum portion may have a rotation rate different than the rotation rate of the second drum portion.

In an embodiment, the forming device may include a first drive device in operative communication with the first drum portion and a second drive device in operative communication with the second drum portion. The drive devices may be configured to rotate the respective first and second drum portions.

In an embodiment, a first extrudate may pass between the first drum portion of the first drum and the first drum portion of the second drum. A second extrudate may pass between the second drum portion of the first drum and the second drum portion of the second drum. The first extrudate may have a first flow rate that corresponds to a first drum portion rotation rate and the second extrudate may have a second flow rate corresponding to the second drum portion rotation rate. In an embodiment, the first drum portion rotation rate is different than the second drum portion rotation rate.

In an embodiment, at least one extrudate may include a plurality of adjoining ropes. The adjoining ropes may or may not be center-filled. In an embodiment, at least one extrudate is a center-filled extrudate.

In an embodiment, the forming device may include an extrudate guideway located upstream of the forming device. The guideway may guide and/or shape the extrudate as it enters the forming device.

In an embodiment, the forming device may include a cooling device in operative communication with the rotating drums. The cooling device may pass a cooling fluid through the rotating drums. The rotating drums may have a temperature from about 0° C. to about 20° C. In a further embodiment, the forming members may include a jet orifice for discharging a fluid, such as a gas, to eject the confectionery pieces from the forming device.

In an embodiment, a method for forming a confectionery product is provided. The method includes providing a pair of opposing rotating drums. Each drum may have forming members. Each drum may also include a first drum portion and a second drum portion. The method may further entail passing a first extrudate between the first drum portions at a first rate, and passing a second extrudate between the second drum portions at a second rate different than the first rate. The forming members may cooperatively engage in a mating manner to form separate confectionery pieces from the extrudates.

In an embodiment, at least one extrudate may be a multiple confectionery rope extrudate. In a further embodiment, at least one extrudate may be a center-filled extrudate. Upon cooperative engagement of the forming members, the forming device forms sealed separate center-filled confectionery pieces from the center-filled extrudate.

In an embodiment, the method may include cooling the separate confectionery pieces. The pieces may be cooled by passing a fluid through the drums. The fluid may have a temperature from about 0° C. to about 20° C.

In an embodiment, the method may include removing the separate confectionery pieces from the forming members. The removal may include dropping the confectionery pieces from the forming members, ejecting the confectionery pieces from the forming members, and combinations thereof.

In an embodiment, the method may include guiding with a guideway at least one extrudate between the rotating drums. The guideway may also be used to shape at least one extrudate.

In an embodiment, a forming device for forming a confectionery product is provided. The forming device may include a rotating drum having first forming members disposed on an outer drum surface. A forming panel may be disposed adjacent to and moveable along a length of the outer drum surface. The forming panel may have second forming members. The second forming members may cooperatively engage with the first forming members.

In an embodiment, the forming panel may be rotatable with the rotating drum. The forming panel may also be moveable between a first position and a second position, namely, a retracted position and an extended position. Movement between the retracted and extended positions may occur along the length of the rotating drum. In an embodiment, the forming device may include a plurality of forming panels, the forming panels circumferentially surrounding the outer drum surface.

In an embodiment, the forming device may include a pressing roller adapted to contact an outer surface of the forming panel. Contact between the pressing roller and the forming panel may move the forming panel to a forming position. In an embodiment, the first and second forming members cooperatively engage when the forming panel is at the forming position.

In an embodiment, the first forming members may be adapted to receive a confectionery extrudate when the forming panel is in a retracted position. The confectionery extrudate may contact the first forming members and the second forming members may cooperatively engage the first forming members to form separate confectionery pieces.

In an embodiment, the extrudate may be a plurality of extrudates, a multiple rope extrudate, a center-filled extrudate, an extrudate having a plurality of center-filled multiple ropes, and combinations thereof. In an embodiment, the extrudate may be a center-filled extrudate with the separate confectionery pieces being sealed center-filled confectionery pieces.

In an embodiment, a method for producing a confectionery product is provided. The method includes contacting a confectionery extrudate with first forming members disposed on an outer surface of a rotating drum. The method further includes moving a forming panel along a length of the drum and over the extrudate. The forming panel may have second forming members. The method also entails cooperatively engaging the first forming members with the second forming members to form separate confectionery pieces from the confectionery extrudate. The forming panel may be rotated with the rotating drum.

In an embodiment, the moving may include retracting and extending the forming panel along a length of the rotating drum. Contact between the second forming members and the extrudate may be avoided during the retracting and extending movement of the forming panel.

In an embodiment, the cooperative engagement between forming members may include pressing the forming device with a pressing roller and moving the second forming members toward the first forming members. This pressing may occur when the forming panel is in the extended position.

In an embodiment, the method may include retracting the forming panel and exposing the separate confectionery pieces. This retracting step may include moving the second forming members away from the first forming members, retracting the forming panel along the drum length, and combinations thereof.

In an embodiment, the confectionery extrudate may be a center-filled confectionery extrudate. The method may thereby include forming sealed separate center-filled confectionery pieces.

In an embodiment, the method may include cooling the separate confectionery pieces. Cooling may be achieved by passing a cool fluid through the drums. The fluid may have a temperature from about 0° C. to about 20° C.

In an embodiment, the method may include removing the separate confectionery pieces from the forming members. Removal may include dropping the confectionery pieces from the forming members, ejecting the confectionery pieces from the forming members, and combinations thereof.

In an embodiment a center-filled confectionery product is provided. The confectionery product includes an inner fill portion encased by an outer portion. In an embodiment, the confectionery product includes a liquid fill portion and a chewing gum outer portion. In a further embodiment, the confectionery product may include a flange. The flange may extend around or about the periphery or peripheral edge of the product. In an embodiment, the flange may form a peripheral edge around the circumference or perimeter of the confectionery product. In a further embodiment, the flange may be free of fill material and be composed of substantially only outer confectionery material.

Additional features and advantages are described herein, and will be apparent from, the following Detailed Description and the Figures.

DETAILED DESCRIPTION

Figures 1, 2:
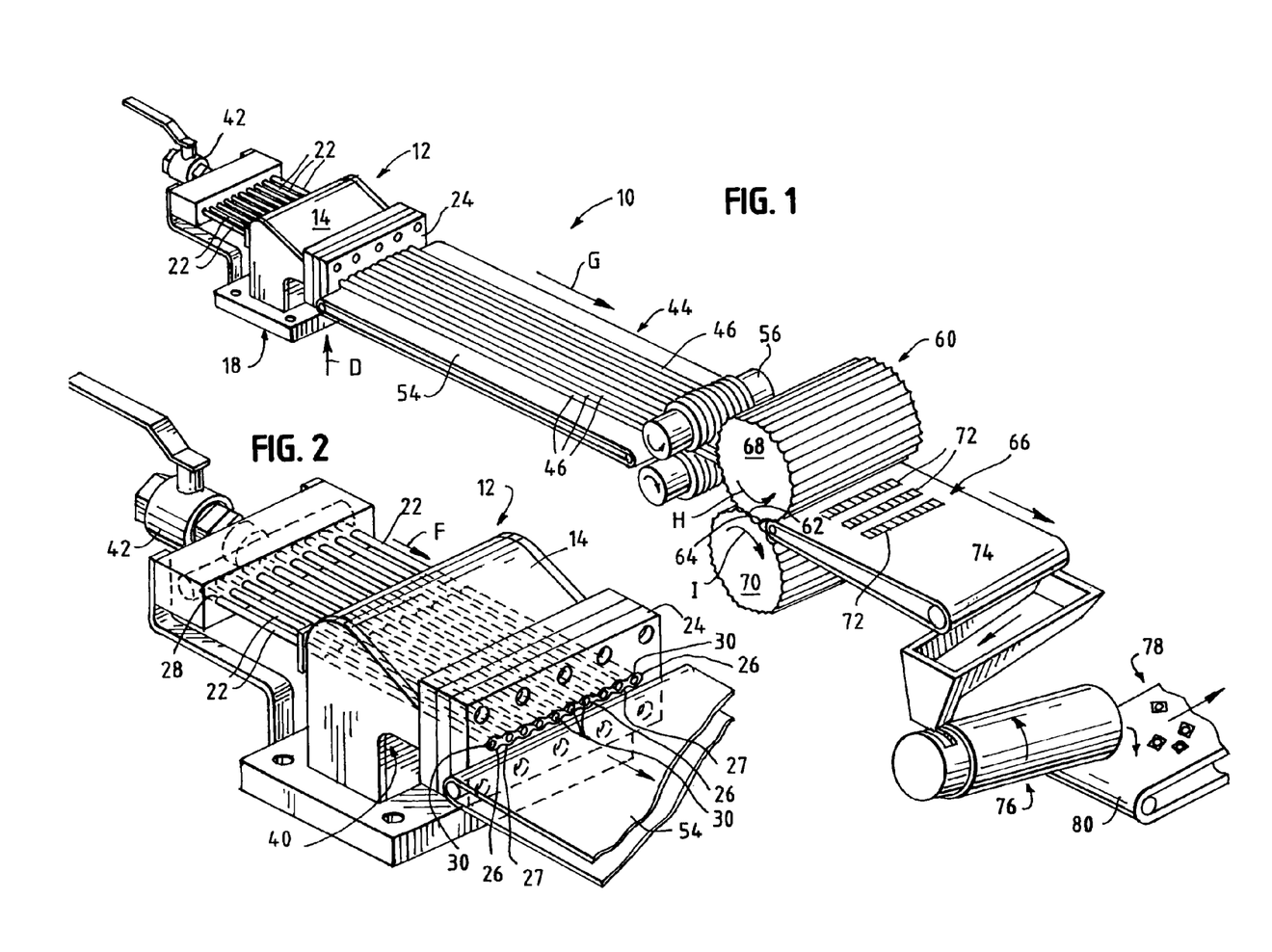
FIG. 1 is a perspective view of an apparatus for producing a center-filled confectionery in accordance with an embodiment of the present disclosure.
FIG. 2 is a perspective view of an apparatus for producing a center-filled extrudate in accordance with an embodiment of the present disclosure.
Figure 3:
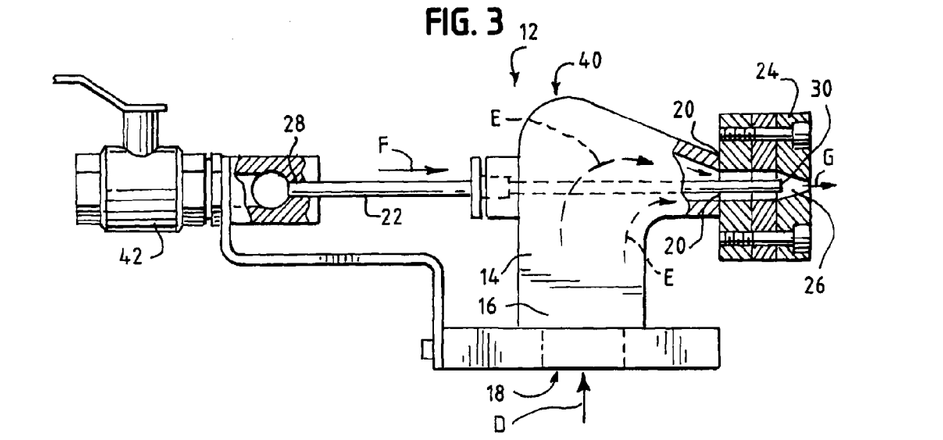
FIG. 3 is a side elevation view of the apparatus of FIG. 2.

Referring to the Figures generally, where like reference numerals denote like structure and elements, and in particular to FIGS. 1-3, an apparatus 10 for producing a center-filled confectionery is shown. Apparatus 10 includes an extruder 12, and a forming device 60.

Figure 4:
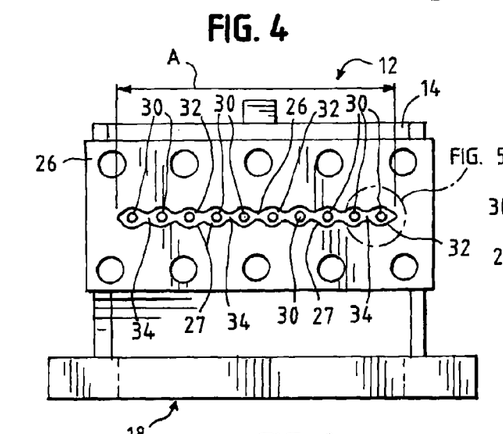
FIG. 4 is a front elevation view of the apparatus of FIG. 2.

Extruder 12 includes a manifold 14 that defines a passageway 16 having an inlet 18 and an outlet 20. A plurality of annular conduits 22 may extend through a portion of passageway 14. Although FIGS. 1, 2 and 4 show 10 conduits extending through the passageway, it is understood that apparatus 10 may include from about 2 conduits to about 10 conduits, or about 20 conduits, or about 30 or more conduits, or any number of conduits therebetween. In an embodiment, conduits 22 are substantially parallel to each other and may be disposed in a spaced apart linear arrangement as shown in FIG. 2.

Extruder 12 also includes an exit port 24 having an orifice 26. Exit port 24 may be secured to manifold 14 to provide fluid communication between passageway outlet 20 and orifice 26. Each conduit has an inlet end 28 and a discharge end 30. As conduits 22 may be arranged in a spaced apart manner, so too may discharge ends 30 be arranged in a spaced apart manner in orifice 26. Orifice 26 has a width A (FIG. 4) with sufficient length to accommodate spaced apart discharge ends 30. In an embodiment discharge ends 30 are disposed in a spaced apart linear arrangement in orifice 26 as best seen in FIG. 4.

Figure 5:
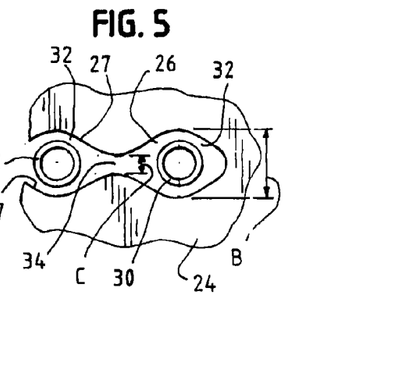
FIG. 5 is an enlarged view of area 5 of FIG. 4.

Turning to FIGS. 4 and 5, orifice 26 includes an outer edge 27 having a wavy contour to give orifice 26 a shape that resembles a string of beads. Outer edge 27 defines a plurality of spaced apart wide portions 32 with narrow portions 34 disposed therebetween. Wide portions 32 correspond to the areas of orifice 26 in which conduit discharge ends 30 are disposed. Consequently, wide portions 32 each have an extent or diameter B (as seen in FIG. 5) that traverses discharge end 30 and also traverses a portion of orifice 26. Discharge ends 30 may be considered to be substantially concentrically disposed within respective wide portions 32 so that wide portions 32 substantially surround respective discharge ends 30.

In an embodiment, diameter B may have a length from about 1.0 mm to about 10 mm, or about 2 mm to about 8 mm, or about 3 mm to about 5 mm.

Orifice 26 also includes narrow portions 34, the narrow portions disposed between wide portions 32. In other words, narrow portions 34 connect or otherwise adjoin adjacent wide portions 32 thereby forming a single unitary orifice 26. Each narrow portion 34 has a distance interval C that extends between opposing edges 27 of the orifice. As can be seen in FIG. 5, distance interval C does not traverse a conduit discharge end. In an embodiment, extent B may be greater in length than distance interval C. In a further embodiment, distance interval C may have a length from about 0.3 mm to about 1.5 mm, or about 0.5 mm to about 1.0 mm.

In an embodiment, passageway 16 may be adapted to receive a fluid confectionery 36 from a source (not shown) of confectionery material such as a mixer or a hopper for example, as is commonly known in the art. The confectionery material may be any hard candy, soft candy, chewing gum, or other confectionery substance, or compound that has a fluid phase or may take a fluid or a pliable form. In other words, the confectionery material may be heated or melted, form a syrup, or be dissolved in a liquid to become flowable or fluid as is commonly known in the art. The skilled artisan will appreciate that the moisture content (and concomitant viscosity) of the confectionery material may vary greatly. The moisture content of the flowable phase of the confectionery substrate may typically be in the range of about 0.5% to about 20% by weight of the confectionery material. The fluid confectionery material may be subsequently cooled or solidified at room temperature to form a solid or semi-solid confectionery. Nonlimiting examples of suitable confectionery materials that are fluid or may placed into a fluid or pliable state include pastes, gels, syrups, liquids or solids for making hard candies, soft candies, lollipops, fondants, toffees, taffies, jellies (or gel candy), chewing gums, chocolates, gelatins and nougats. The fluid confectionery material may include sugar or may be sugar-free. Coloring may be added to the fluid confectionery material as desired. The confectionery material may also include a pharmaceutical product, an active ingredient, or a medicament. In an embodiment, fluid confectionery 36 may be a chewing gum. Although the present disclosure is directed to confectionery materials, apparatus 10 may be used to form other extrudable center-filled items such as other extrudable foods (i.e., starches, pastas) as well as center-filled polymeric materials and products.

Conduit inlet ends 28 may be adapted to receive a fill material 38 from a fill source (not shown). Fill material 38 may be a flowable solid material (i.e., a granular or powder material), a fluid confectionery material, a liquid, a gel, a paste and combinations thereof. Similar to fluid confectionery 36, fill material 38 may be any hard candy, soft candy, chewing gum, or other confectionery substance, or compound that has a fluid phase, may take a fluid form, or may be flowable. Fill material 36 may include a pharmaceutical product, an active ingredient, or a medicament. Indeed, fluid confectionery 36 and fill material 38 may be the same or different material. Fill material 38 may be heated, melted, dissolved, form a syrup, or become flowable or fluid as is commonly known in the art. Consequently, fill material 38 may be a liquid, a semi-liquid, a syrup, a gel, a paste, a semi-solid, or a flowable solid such as a granular solid or a confectionery in powder form at ambient conditions. In an embodiment, fill material 38 may be a liquid with a viscosity that may be adjusted as desired. The liquid may be further sweetened, flavored, and/or colored as desired. In a further embodiment, fill material 38 may be a thixotropic fluid—i.e., a fluid or gel that becomes a fluid when agitated, stirred or shaken, and returns to a semisolid state upon standing. One of ordinary skill in the art would understand that the viscosity of a thixotropic fluid lowers the longer the fluid/gel undergoes shear, with viscosity increasing when the fluid/gel is at rest to return the fluid/gel to a stable solid or semisolid state at rest.

Extruder 12 includes a drive mechanism (not shown) as is commonly known in the art to drive, force, or otherwise push fluid confectionery 36 into passageway inlet 18 as shown by arrow D of FIG. 3. Fluid confectionery 36 proceeds through passageway 16, through passageway outlet 20 and through orifice 26. At orifice 26, fluid confectionery 36 fills the entire area of the orifice, filling orifice wide and narrow portions 32, 34. In so doing, fluid confectionery 36 surrounds or otherwise encases conduit discharge ends 30 at orifice 26.

In an embodiment, passageway 16 may include a bend 40. Bend 40 changes the flow direction of confectionery 36 through manifold 14 as indicated by curved arrow E of FIG. 3. Bend 40 may alter the confectionery flow angle from about 1° to about 90°. In an embodiment, bend 40 may have an angle of about 90° as shown in FIG. 3.

Figure 6:
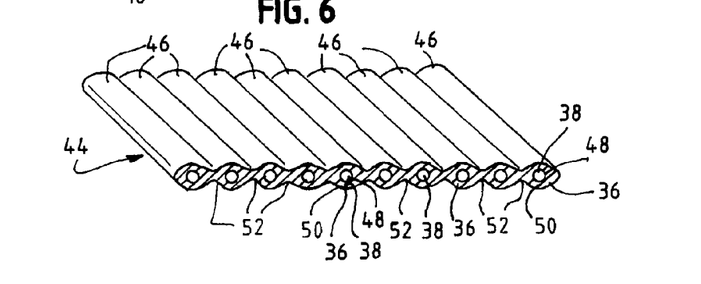
FIG. 6 is a perspective view of an extrudate in accordance with an embodiment of the present disclosure.

Extruder 12 may also include a flow regulator 42 to control the flow of fill material 38 from the fill material source into and through conduits 22 as shown by arrow F in FIG. 3. Each conduit 22 may have a dedicated flow regulator. Alternatively, a single flow regulator may control the flow of fill material 38 into all conduits 22. Fill material 38 continues through conduits 22 and is discharged from discharge ends 30 at orifice 26. Confectionery 36, surrounding each discharge end 30 at orifice 26, subsequently surrounds or otherwise encases the flow of each respective fill material 38 upon exit from orifice 26. Extruder 12 thereby forms a continuous extrudate 44 that includes a plurality of center-filled confectionery ropes 46, the number of ropes corresponding to the number of conduits 22. Each rope 46 includes an inner portion 48 of fill material 38 and an outer portion 50 of the fluid confectionery 36, the outer portion 50 surrounding or wholly encasing inner portion 48 of fill material as shown in FIG. 6. Extrudate 44 flows from extruder 12 in the direction of arrow G as shown in FIGS. 1 and 3. FIG. 6 shows strand portions 52, corresponding to fluid confectionery 36 extruded from narrow portions 34. Strand portions 52 extend between adjacent ropes 46 adjoining or otherwise attaching ropes 46 to each other. Consequently, extrudate 44 may be considered an integral extrudate.

In an embodiment, conduits 22 may be removed from manifold 14. In this embodiment, the extrudate may be a plurality of single-phase confectionery ropes adhered to each other by way of the strand portions. In other words, removal of conduits 22 from manifold 14 eliminates the center-fill portion of the extrudate resulting in a single phase, multi-rope extrudate. The single phase multi-rope extrudate may be further processed and/or formed and/or coated in any manner as described herein for the extrudate 44. The single phase multi-rope extrudate may be any confectionery material described herein. In an embodiment, the single phase multi-rope extrudate may be a chewing gum. Apparatus 10 may advantageously provide a high volume, efficient production system for the production of single phase confectionery products.

Continuous extrudate 44 may be received by a transport device 54, such as a conveyor, for example. In an embodiment, transport device 54 may be a belt cooler that receives and transports extrudate 44 away from extruder 12 and simultaneously cools the extrudate. In an embodiment, apparatus 10 may include sizing rollers 56 to reduce the diameter of one, some, or all of confectionery ropes 46 as is commonly known in the art.

In an embodiment, transport device 54 transports extrudate 44 to a forming device. The forming device may be any forming device as is commonly known in the art. Non-limiting examples of suitable forming devices include opposing first and second rotating drum mechanisms, rotating drum and continuous chain mechanisms, and rotating drum mechanisms having die and cutter rings with mating die members. The extrudate 44 may enter the forming device as a plurality of adjoined filled, or center-filled, confectionery ropes (such as the extrudate shown in FIG. 1, for example). Alternatively, extrudate 44 may be divided or otherwise separated into a plurality of individual or single center-filled confectionery ropes prior to entering the forming device. This may be accomplished by placing one or more dividing devices in the flow of extrudate 44. The dividing device may have a sharp point or tip that opposes the oncoming strand portions 52 to split, separate, divide, or cut extrudate 44 along the strand portions and into a plurality of individual ropes upstream of the forming device. Each individual rope may then be directed to the same forming device or different forming devices as is commonly known in the art.

Figure 7:
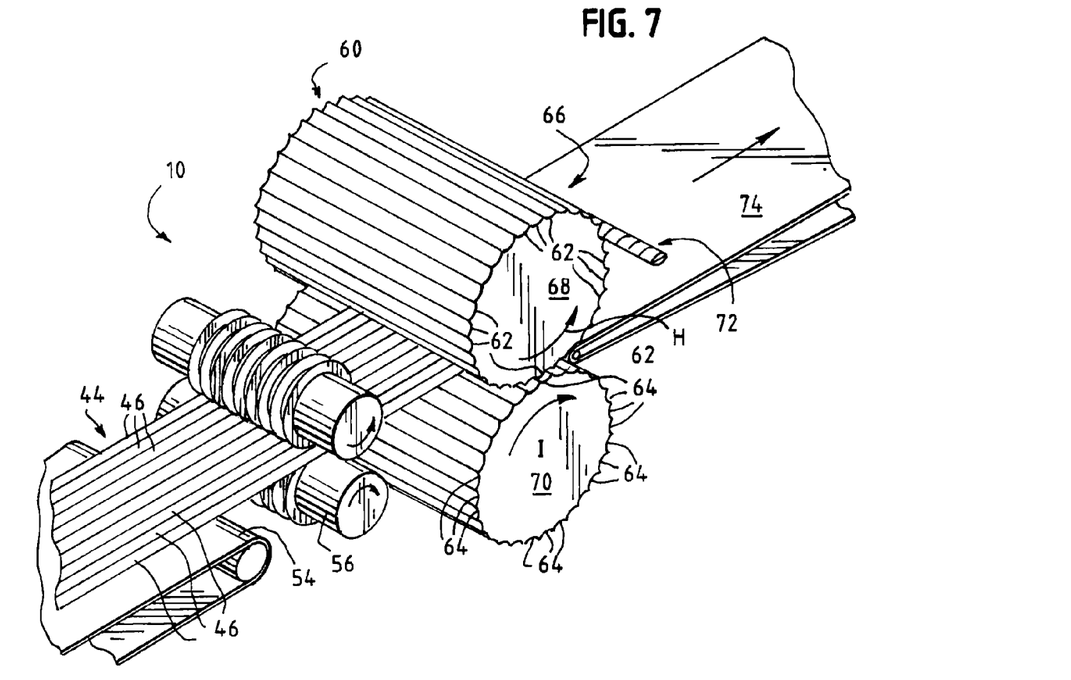
FIG. 7 is a perspective view of a forming device in accordance with an embodiment of the present disclosure.

In an embodiment, transport device 54 transports extrudate 44 to forming device 60 as shown in FIGS. 1 and 7. Forming device 60 may include a first forming member 62 and a second forming member 64, forming members 62, 64 disposed on opposing of extrudate 44. Each forming member 62, 64 may be constructed or otherwise shaped to form half of finished product, forming members 62, 64 mating to form a full or complete confectionery piece or web, when forming members 62, 64 are placed in registration with each other. Forming members 62, 64 may cooperatively engage extrudate 44 in order to crimp and cut extrudate 44, thereby forming a sealed center-filled confectionery component 66.

In an embodiment, forming device 60 may be a pair of opposing rotating drums 68, 70 disposed on opposing sides of extrudate 44, drums 68, 70 contra-rotating to form sealed center-filled component 66. In this embodiment, first forming member 62 may be disposed on a circumferential surface of rotating drum 68. First forming member 62 may extend along substantially the entire length of drum 68 in order to accommodate the entire width of extrudate 44. In a further embodiment, rotating drum 68 may include a plurality of first forming members 62, the forming members extending around substantially the entire circumferential surface of drum 68 as shown in FIGS. 1 and 7.

Similarly, second forming member 64 may be disposed on a circumferential surface of rotating drum 70. In an embodiment, a plurality of forming members 64 may cover substantially the entire circumferential, peripheral, or outer surface of rotating drum 70. Rotating drums 68, 70 may rotate in contrary motion as indicated by arrows H and I, to bring forming members 62, 64 into cooperative registration with each other. First and second forming members 62, 64 are configured to matingly form the shape of the final confectionery product when brought into cooperative engagement with each other. Rotation of drums 68, 70 brings forming members 62, 64 into contact with extrudate 44, whereby continued drum rotation crimps or otherwise squeezes opposing sides of outer portion 50 into contact with each other to form a seal around inner portion 48 (i.e., fill material 38) of each confectionery rope 46. Further rotation of drums 68, 70 brings forming members 62, 64 into further cooperation with each other to perforate or otherwise cut extrudate 44 and form sealed center-filled confectionery component 66. The shape of each forming member 62, 64 may be varied as desired to yield a confectionery component having an spheroidal, polygonal, elliptical shape as desired. Although FIG. 7 shows extrudate 44, a plurality of center-filled extrudate ropes, passing through forming device 60, it is understood that forming device 60 may be used to form a sealed confectionery piece from a single center-filled rope extrudate.

Figure 8:
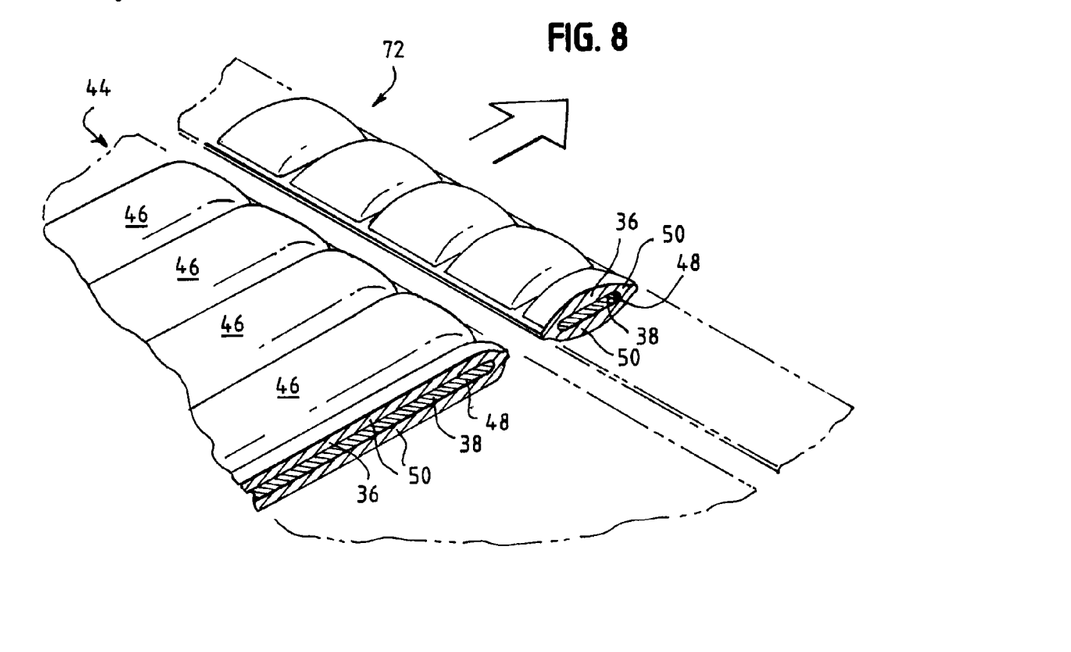
FIG. 8 is a partially cut-away perspective view of a center-filled confectionery component in accordance with an embodiment of the present disclosure.

In an embodiment, sealed center-filled confectionery component 66 may include a web 72 of adjoined sealed center-filled confectionery pieces as shown in FIG. 8. Segments of strand portion 52 adjoin the center-filled pieces. The number of pieces may correspond to the number of individual center-filled ropes 46 of extrudate 44. Outer portion 50 surrounds or otherwise wholly encases inner portion 48 as shown in FIG. 8. Each individual sealed center-filled confectionery piece may be identified by its pillow shape as seen in FIG. 8.

Alternatively, apparatus 10 may include a cutting device (not shown) positioned upstream of forming device 60. The cutting device may cut extrudate 44 along strand portions 52 to form a plurality of discrete or individual center-filled confectionery ropes prior to passage into the forming device. Consequently, when the plurality of individual center-filled ropes are exposed to the crimping and cutting process upon passage through forming device 60, a plurality of discrete sealed center-filled individual confectionery pieces may be formed.

In an embodiment, apparatus 10 may include dispenser (not shown) upstream of forming device 60, the dispenser positioned on either or both sides of extrudate 44. The dispenser may be used to apply or spray an adhesion reducer onto some or all of the exterior surface area of extrudate 44. Nonlimiting examples of suitable adhesion reducers include oil, food grade oil, talc, calcium carbonate and combinations thereof. In an embodiment, the adhesion reducer may be a food grade oil. Application of an adhesion reducer onto extrudate 44 prior to passage through forming device 60 advantageously reduces the occurrence of adherence of extrudate 44 to the forming device and improves the releasability of component 66 from first and/or second forming members 62, 64.

As is known in the art, adhesion of freshly extruded confectionery material processing equipment and components downstream of the extrudate is a constant problem. In an embodiment, extrudate 44 may be cooled upstream of forming device 60 upon contact to transport device 54 that may be a cooling belt. In a further embodiment, fill material 38 may be delivered through conduits 22 at a reduced temperature. In an embodiment, the temperature of fill material 38 upon exit from orifice 26 may be from about 1° C. to about 15° C. or about 3° C. to about 10° C. Provision of cool fill material advantageously cools outer portion 50 (i.e., fluid confectionery 36) of each rope 46 from the inside. It is understood that a cooling belt, alone or in combination with chilled fill material, may be used to cool extrudate 44 upstream of forming device 60.

In an embodiment, apparatus 10 may include a cooling system in operative communication with rotating drums 68, 70. The cooling system may be used to introduce a flow of cool or chilled fluid (i.e., cold water, liquid nitrogen, and the like) into and out of the interior of rotating drums 68, 70 in order to cool the circumferential surfaces and correspondingly cool forming members 62, 64. In an embodiment, the forming members 62, 64 may have a temperature from about −78° C. to about 25° C., or from about 0° C. to about 20° C. Cooled forming members advantageously reduce the occurrence of adhesion between the forming members and extrudate 44 and/or confectionery component 66.

In yet a further embodiment, the forming members 62, 64 may include orifices whereby a jet of air may be blown to assist in the release of confectionery component 66 from the forming members.

In an embodiment, apparatus 10 may further include transport device 74 for receiving and transporting sealed center-filled confectionery components 66 as shown in FIG. 1. Transport device 74 may transport web 72 to a separating device 76 that separates web 72 into a plurality of discrete sealed center-filled individual confectionery products 78. In an embodiment, separating device 76 may be a breaking drum. Individual products 78 may be transported by transport device 80 for further processing. For example, products 78 may be transported to a coating device to coat the products, products 78 may be transported to a curing device for curing, and/or products 78 may be transported to a packaging device for packaging.

In an embodiment, a coating may be applied to products 78. Products 78 may be coated with coating materials to form a soft shell coating or a hard shell coating as is commonly known in the art. The coating process may include a repetitive powder charge/syrup charge pan coating process to build, layer by layer, a coating upon each individual product 78. Nonlimiting examples of suitable coating materials include sugars, polyols, or combinations thereof in powder and/or syrup form. In an embodiment, the coating may be a crystalline or a glassy coating. The sugars or polyols may be, for example, a component of a syrup that is sprayed onto products 78 in a pan coating device. Dry charges of the sugar/polyol may be applied between syrup applications. The coating may also include a sweetener, a flavorant, a film forming agent, a colorant, a sensation producing ingredient, and combinations thereof. The sweetener may be sugar, sugar-based, or sugar-free. Non-limiting examples of suitable sweeteners include, maltitol, sorbitol, erythritol, mannitol, isomalt, lactitol, xylitol and combinations thereof. High intensity sweeteners may also be utilized in the coating. Nonlimiting examples of suitable sensation producing ingredients may include a cooling agent, a food grade acid, a flavorant, and combinations thereof. Alternatively, web 72 may be coated. Web 72 may be coated with any coating material and/or coating component as discussed herein, the coating applied to web 72 may be a pre-coat or a final coat as desired.

Figure 13:
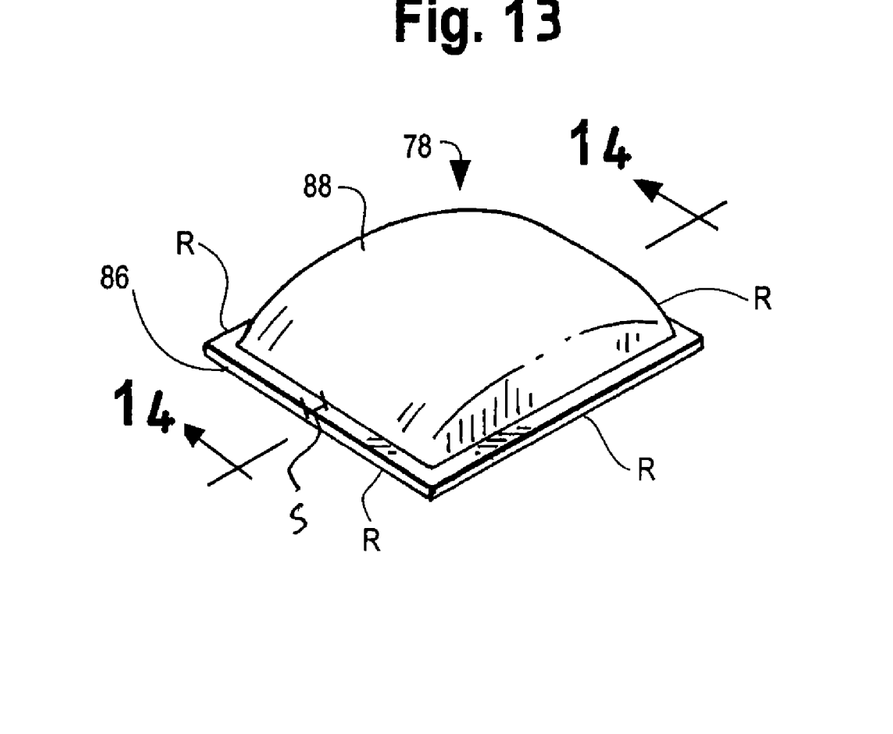
FIG. 13 is a perspective view of a center-filled confectionery piece in accordance with an embodiment of the present disclosure.
Figure 14:
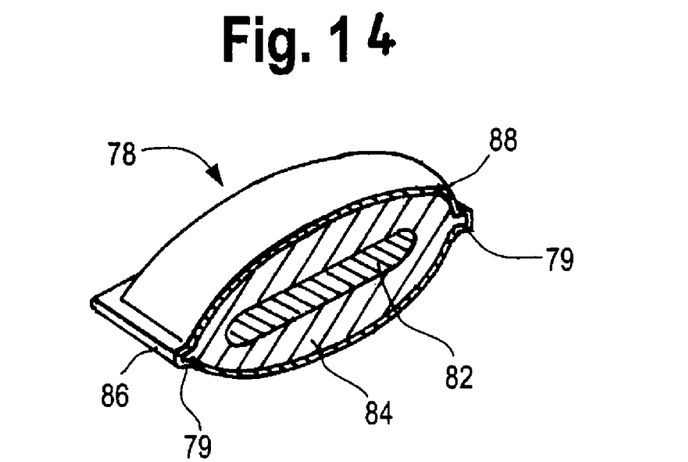
FIG. 14 is a sectional view taken along line 14-14 of FIG. 13.

FIGS. 13 and 14 depict sealed center-filled confectionery product 78. Center-filled confectionery product 78 includes a fill portion 82 that is surrounded or otherwise encased by outer portion 84. Portions 82 and 84 may be any confectionery material as previously discussed herein. In an embodiment, fill portion 82 may be a liquid such as a flavored and/or sweetened and/or colored syrup and outer portion 84 may be a chewing gum. In an embodiment, apparatus 10 and/or any forming device disclosed herein may be used to produce a center-filled confectionery product as disclosed in commonly-owned, co-pending patent application entitled "Center-Filled Confectionery and Method," Ser. No. 11/556,440, which is concurrently filed herewith and is hereby incorporated by reference in its entirety.

In an embodiment, the forming process (i.e., formation of web 72 with forming members 62, 64) may be coordinated with the filling of the confectionery ropes with fill material. A controller (not shown) may be operatively connected to flow regulator 42 and forming device 60. Upon initial engagement of forming members 62, 64 with extrudate 44 (initial crimping), the controller may direct flow regulator 42 to initiate flow of fill material 36 into confectionery ropes 46 simultaneously with the crimping and/or cutting. The flow of fill material may occur intermittently, for about 0.1 seconds to about 3 seconds, for example. Alternatively, the flow of fill material into the ropes may be continuous. Nonlimiting examples of suitable controllers may include a timing device, a programmable logic control, and the like.

In this context, the controller may direct a pulse pumping of fill material 38 whereby the fill material may be intermittently introduced into the confectionery ropes simultaneously with the crimping of extrudate 44 by the forming device 60. This intermittent introduction of fill material into the extrudate coordinated with the crimping and cutting action of forming device 60 may advantageously prevent backflow of fill material 36 in extrudate 44 and/or conduits 22. Backflow may be considered a flow in a direction opposite of the extrudate flow (extrudate flow shown by direction arrow G). Prevention of backflow beneficially contributes to the formation and maintenance of ropes 46 having a uniform size and diameter along the length thereof and the provision of a uniform amount of fill material with each rope and along substantially the entire length of the extrudate.

Further advantages of the multiple rope extrusion process provided by apparatus 10 are many. First, provision of straight conduits 22 permits greater flow control of the fill material. Straight conduits 22 provide a more precise fill and consistent flow rate of fill material into each rope 46. Moreover, the flow rates between the multiple conduits may be controlled with a high degree of precision to provide a uniform fill material flow rate between the conduits. In an embodiment, each conduit 22 may be operatively connected to a pressure regulator that detects the fluid pressure of the fill material in each rope 46. Any inconsistencies in pressure between the ropes, resulting from flow blockage for example, may be readily detected and addressed.

Second, the capability to form web 72 of 2, 5, 10, 20, or 30 or more adjoined sealed center-filled confectionery pieces increases the per-run output capacity when compared to conventional single rope processing equipment. This increase in per-run capacity by apparatus 10 permits the flow rate of extrudate 44 to be decreased without the a loss in per-run output, particularly when compared to production systems based on a single rope extrusion process. Apparatus 10 thereby provides a slower extrudate flow rate which enables greater control and precision of 1) filling of fill material 36 into ropes 46, 2) extrusion of fluid confectionery 38, and 3) the crimping and cutting of extrudate 44 with forming device 60. Improved control of flow and process parameters translates into increased production yields—i.e., the reduction or elimination of leakers. Leakers may be considered unacceptable product resulting from a faulty seal of outer portion 50 (fluid confectionery) around inner portion 48 (fill material). Leakers exhibit leaked center-fill material on the exterior surfaces of sealed center-filled confectionery component 66 (either web 72 or products 78). Leakers may result from improper forming, uneven filling of fill material, and combinations thereof.

In an embodiment, apparatus 10 may provide an extrudate flow rate from about 2 m/mm to 20 m/mm, or about 10 m/min with a product output of 8200 individual center-filled confectionery pieces per minute. This stands as a marked improvement over conventional center-filled confectionery production systems that typically operate with an extrudate flow rate of about 45 m/min and a product output of about 2600 individual center-filled confectionery pieces per minute.

Figure 9:
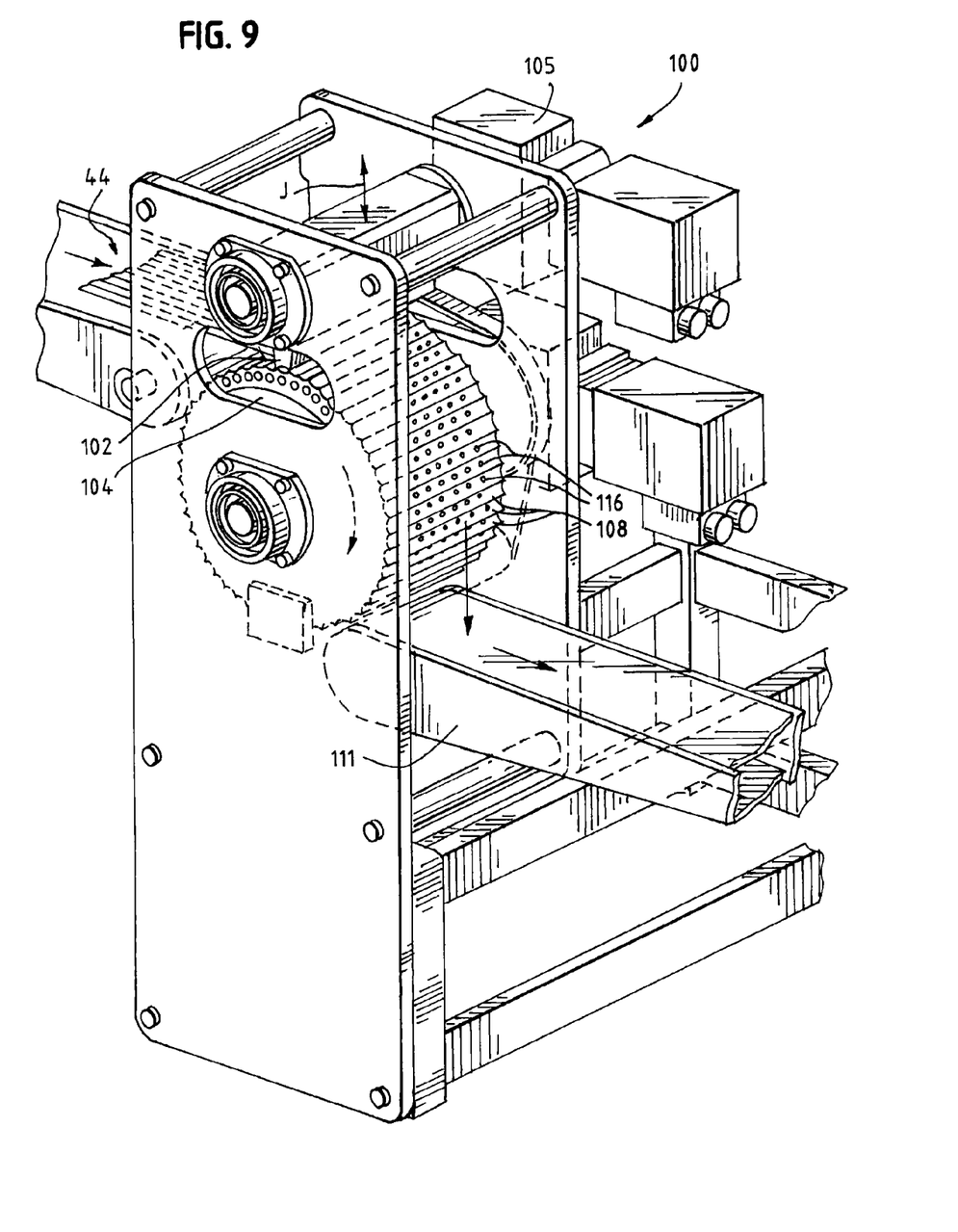
FIG. 9 is a perspective view of a forming device in accordance with an embodiment of the present disclosure.
Figure 10:
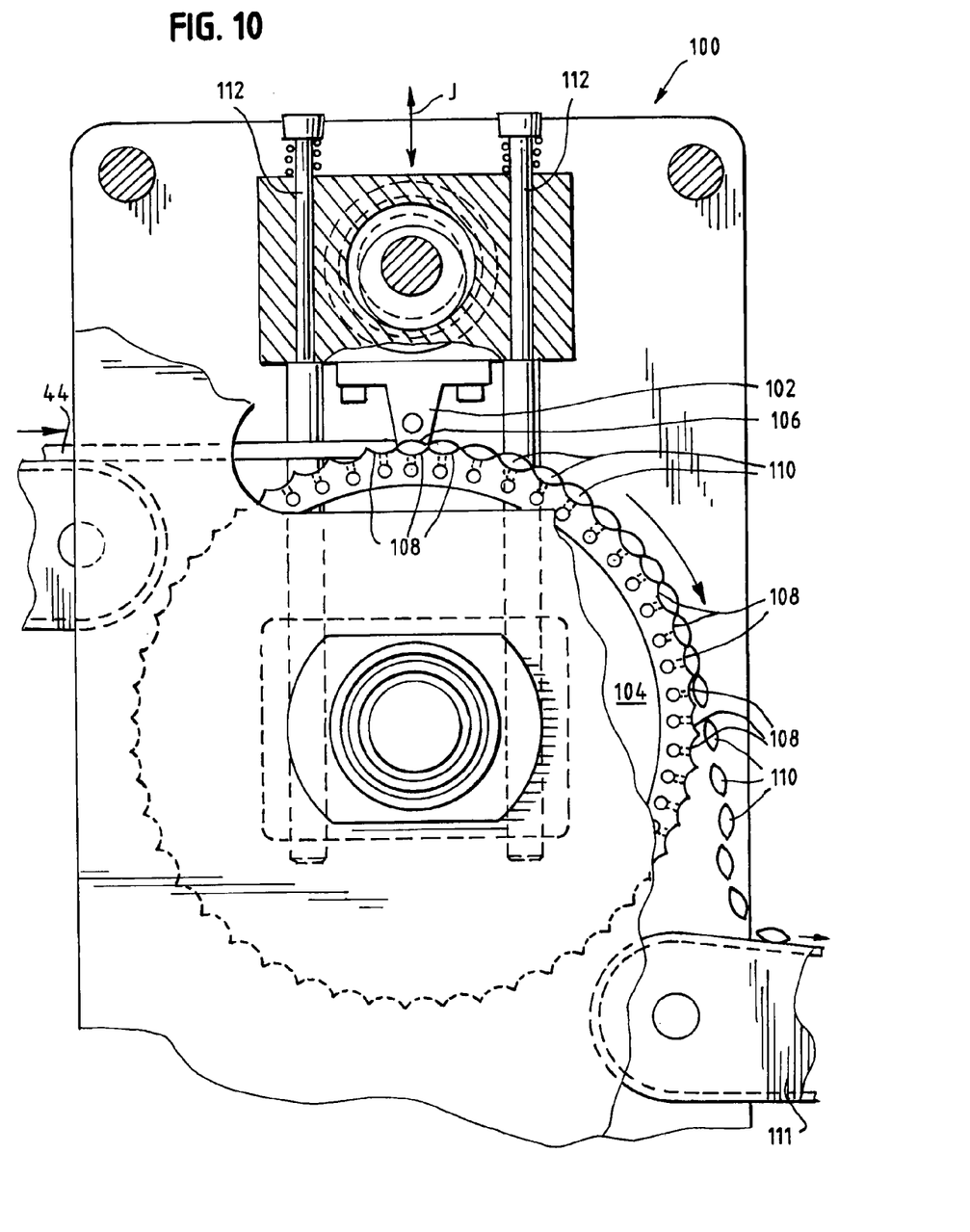
FIG. 10 is an elevation view of the forming device of FIG. 9.

In an embodiment, apparatus 10 may include forming device 100 as shown in FIGS. 9 and 10. Forming device 100 includes a cutting device 102 and a rotating drum 104. Cutting device 102 and rotating drum 104 may be disposed on opposing sides of extrudate 44. Cutting device 102 may include a first forming member 106 and rotating drum 104 may include a second forming member 108. Forming members 106, 108 may cooperatively engage extrudate 44 to crimp and cut the extrudate to form a sealed center-filled confectionery component 110. In an embodiment, rotating drum 104 may include a plurality of forming members 108 disposed about substantially the entire circumference thereof, as previously discussed.

In an embodiment, cutting device 102 may be disposed above rotating drum 104 as shown in FIGS. 9 and 10. Cutting device 102 may be placed in slidable engagement with vertical guides 112. Rotation of a cam 114 (driven by a servo motor 105), that is in operative communication with cutting device 102 may move the cutting device in an up and down or otherwise substantially vertical manner as indicated by arrow J. Thus, cutting device 102 (as well as first forming member 106) may be moved between an upper idle or non-cutting position and a lower cutting position.

In the cutting position, the protruding edges of first forming member 106 may register with and cooperatively engage the protruding edges of second forming member 108 to crimp and cut extrudate 44. The vertical up and down motion of cutting device 102 advantageously brings both protruding edges of first forming member 106 into cooperative mated registration with the respective protruding edges on second forming member 108. The downward action of cutting device 102 provides a simultaneous crimp and cut motion to opposing sides of the extrudate section being cut. This is different with respect to forming device 60 whereby the rotating motion brings the protruding edges of the mating forming members into cooperation in a sequential manner. The downward vertical cutting motion of cutting device 102 results in an even, balanced formation of sealed center-filled confectionery component 110. Transport device 111 may receive sealed center-filled confectionery component 110.

In an embodiment, the arcuate surfaces of second forming member may include one or more openings 116 whereby a jet of air or similar gas may be discharged to assist in the release of sealed center-filled confectionery component 110 from forming member 108. First forming member 106 may include a similar opening for provision of an air jet in a similar manner. Forming device 100 may be used to crimp and cut a plurality of confectionery ropes (filled or unfilled) as shown in FIG. 9 or a single confectionery rope (filled or unfilled).

Figure 11:
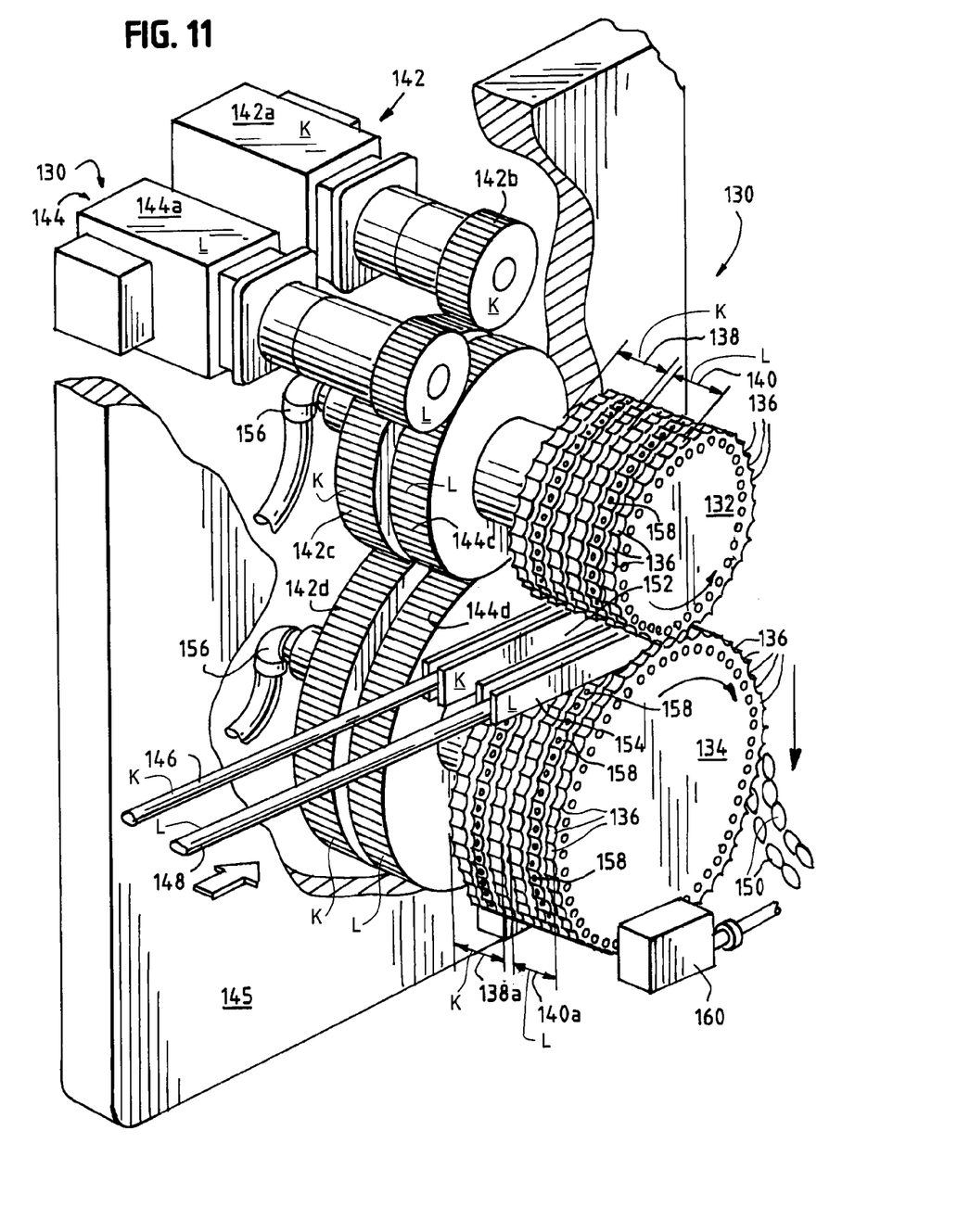
FIG. 11 is a partially cut away perspective view of a forming device in accordance with an embodiment of the present disclosure.

In an embodiment, a forming device 130 is provided as shown in FIG. 11. Forming device 130 includes a pair of rotating drums 132, 134. Each drum 132, 134 includes forming members 136 disposed about the outer circumferential surface of each drum. Rotation or contra-rotation of drums 132, 134 may bring opposing forming members 136 into mated registration with each other, permitting the forming members 136 to cooperatively engage with each other as previously discussed. Drums 132, 134 each have a first drum portion 138 and a second drum portion 140. First drum portion 138 of drum 132 operates in conjunction with first drum portion 138a of drum 134. Second drum portion 140 of drum 132 operates in conjunction with second drum portion 140a of drum 134. Each drum portion 138, 140 has an adjustable rotation rate. Stated differently, the rotation rate of first drum portions 138, 138a may be adjusted independently with respect to the rotation rate of second drum portions 140, 140a. Consequently, first drum portions 138, 138a may rotate at a rate that is different than the rotation rate of second drum portions 140, 140a. Each drum portion 138, 140 may receive, crimp and cut a single confectionery rope (filled or unfilled) or a plurality of confectionery ropes (filled or unfilled, adjoined or separate). Although FIG. 11 shows rotating drums 132,134 each having first and second drum portions, it is understood that each rotating drum may have two, three, four, five, 10, 20 or more or any number therebetween of drum portions.

In an embodiment, forming device 130 may include a first drive device 142 and a second drive device 144. First and second drive devices 142, 144 are substantially similar in components and operation. The following description of first drive device 142 applies equally to second drive device 144, with the appropriate reference numerals for the second drive device presented in parentheses next to the numerals for the first drive device. First drive device 142 includes a drive mechanism 142a (144a), such as a servomotor or the like, that rotates gear 142b (144b). Gear 142b (144b) engages gear 142c (144c) which rotates first drum portion 138 (140). Gear 142b (144b) also engages gear 142d (144d) which drives first drum portion 138a (140a). For the sake of clarity, components associated with first drum portions 138, 138a are also identified by a "K" and components associated with second drum portion 140, 140a are identified by an "L."

In an embodiment, a first extrudate 146 may pass between first drum portions 138, 138a and a second extrudate 148 may pass between second drum portions 140, 140a. Forming members 136 may cooperatively engage extrudates 146, 148, crimping and cutting each extrudate to form individual confectionery pieces 150. In an embodiment, one or both extrudates may be a multiple rope extrudate—i.e., an extrudate having a plurality of adjoining confectionery ropes. In a further embodiment, one or both extrudates may be a center-filled extrudate. In yet a further embodiment, extrudates 146, 148 may each be an extrudate composed of a plurality of center-filled confectionery ropes. Forming device 130 may be configured with sufficient drum portions to accommodate 2, 3, 4, 5, 10, or 20 or more extrudates.

In an embodiment, the rotation rate of each drum portion may be adjusted in accordance with the flow rate for each extrudate 146, 148. For example, if the flow rate for extrudate 146 is 9.5 m/min, the rotation rate for first drum portions 138, 138a may be adjusted to correspond to 9.5 m/min. If the rotation rate for second extrudate 148 is 10.5 m/min, the rotation rate for second drum portions 140, 140a may be adjusted to correspond to 10.5 m/min. Thus, forming device 130 advantageously provides for coordination between extrusion flow rate, extrudate feed rate, and piece formation rate. The rotation rate for each drum portion may be independently adjusted to accommodate the specific flow rate of each extrudate. This is beneficial with center-filled extrudates in particular. Coordination between extrusion flow rate and the rate at which the extrudate is crimped and cut promotes higher production yields as coordination may ensure proper sealing of the pieces and prevention of leakers.

In an embodiment, forming device 130 may include extrudate guideways 152, 154 for extrudates 146, 148 respectively. Guideways 152, 154, located upstream of drums 132, 134, may be used to guide or otherwise properly align the extrudates with forming members 136. Proper extrudate alignment with forming members 136 advantageously promotes effective crimping and cutting of the extrudate to reduce/eliminate the risk of leakers. Guideways 152, 154 may also be used to shape finished pieces 150.

In an embodiment forming device 130 may include a cooling system that introduces a cool fluid into drums 132, 134 to cool forming members 136. The fluid may be water, alcohol, propylene glycol (i.e., antifreeze) or similar fluid that may be cooled to a low temperature to accordingly cool the surfaces of drums 132, 134. In an embodiment, cooling system 156 may cool drums 132, 134 to a temperature from about 0° C. to about 20° C. Lowering the temperature of drums 132, 134 advantageously reduces adhesion between the extrudates/finished pieces and forming members 136. In a further embodiment, forming members 136 may include jets 158 through which a stream of gas (air, nitrogen, or the like) may be passed under pressure to promote release or ejection of pieces 150 from forming members 136. A gas flow source 160 such as an air blower may be in fluid communication with jets 158 to provide a flow, burst, or jet of gas from the forming members.

Further advantages of forming device 130 are multifold. Forming device 130 provides a direct piece formation system by eliminating the need and use of snaking or guide pipes or shaping channels between the extruder and the forming device. Provision of forming device 130 permits feed of extrudate from the extruder directly to the forming device. The extrudate may proceed directly from the extruder to the forming device and the forming members in particular.

Forming device 130 accommodates multiple extrudate production systems by enabling each extrudate to flow or progress at a different speed and precisely match the linear speed achieved at the extruder outlet.

The guideways may be used to maximize/minimize the pillow shape and/or the rectangular, circular, or oval shape of the finished piece. In addition, the guideways may center or align the extrudate with the forming members, and allow better control of the final piece width during the crimp and cut operation. Oval, rectangular, elliptical or any other rope shape can be processed since the rope is not twisted (when snaking) as in the traditional dies. The position and centering of the rope (or ropes) may be precisely controlled along as the extrudate moves from the extruder to the forming device.

The drive devices 142a, 144a may include precise or fine intermesh between the teeth of each gear. This may beneficially eliminate backlash during piece formation.

Chilled water or other cold fluid may be used to cool all metallic parts that are in contact with the rope (or ropes) ensuring that the finished pieces will not stick during the ejection from the forming device.

In an embodiment, a mist of an adhesion reducer or releasing agent may only be needed to maintain the die clean from confectionery residues. The absence in forming device 130 of plungers in continuous motion reduces the need for lubricant. The absence of plungers and springs also permits high linear speeds to be achieved.

The entirety of drive devices 142, 144 may be disposed behind plate 145 segregating all mechanical parts (gears, cams, cam followers, etc.) from the product. Any oil, grease or dirt resulting from drive devices 142, 144 will not come into contact with the product. Segregation of drive devices 142, 144 farther eases cleaning of drums 132, 134. Drums 132,134 may be cleaned using a direct steam jet.

Forming device 130 may accommodate multiple rope extrudates which may or may not be center-filled, dramatically increasing conventional output production rates.

Figure 12:
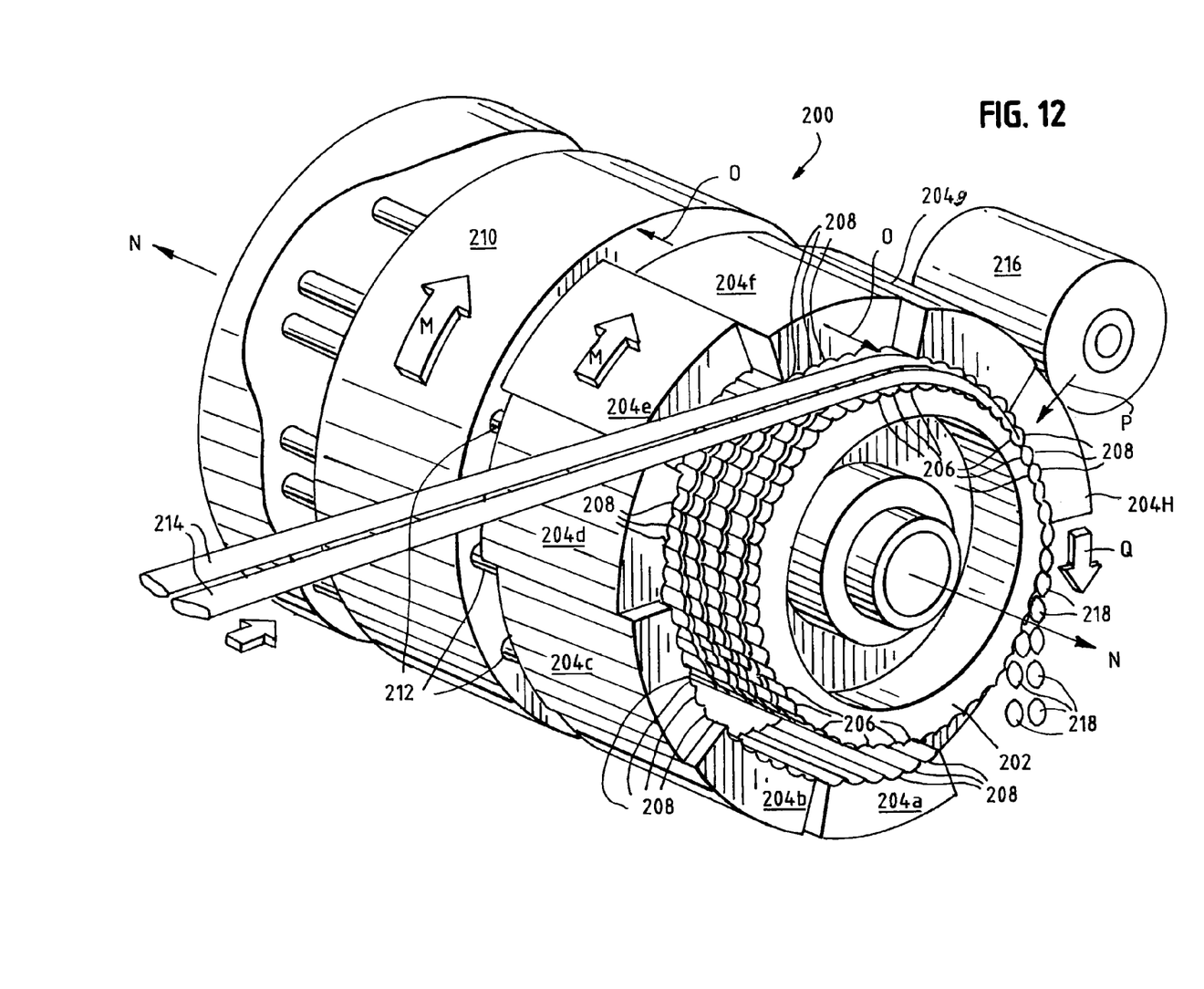
FIG. 12 is a perspective view of a forming device in accordance with an embodiment of the present disclosure.

In an embodiment, a forming device 200 is provided as shown in FIG. 12. Forming device 200 may include a rotating drum 202, and forming panels 204a-h (or forming panel/panels 204). Rotating drum 202 includes first forming members 206 disposed on an outer surface thereof. The outer drum surface may be a peripheral surface or a circumferential surface. First forming members 206 may extend substantially the entire length of drum 202. In a further embodiment, first forming members 206 also cover substantially the entire circumference of rotating drum 202 as shown in FIG. 12.

It is understood that the discussion of a single panel 204 may apply equally to each forming panel 204a-h. Forming panel 204 may be disposed near or adjacent to the outer peripheral surface of rotating drum 202, the forming panel configured so that the forming members 206, 208 may be brought into mated registration with each other. In an embodiment, both rotating drum 202 and forming panel 204 may be attached to a drive case 210 that includes a drive mechanism for rotating both rotating drum 202 and forming panel 204 as shown by arrow M in FIG. 12. In an embodiment, rotating drum 202 and forming panel 204 rotate around axis of rotation N at substantially the same rate. Posts 212 may operatively connect forming panel 204 with drive case 210. In an embodiment, posts 212 may extend and retract to correspondingly move forming panels 204 between a retracted position and an extended position along the length of rotating drum 202. Alternatively, forming panels 204 may be slidingly movable about posts 212 for moving between the retracted and extended positions. Stated differently, forming panels 204 may be movable along an axis that is substantially parallel to axis of rotation N (such as axis O, for example), forming panels 204 movable between a retracted position and an extended position. For example, FIG. 12 shows forming panels 204a-e in the retracted position, while forming panels 204g-h are in the extended position. Forming panel 204f may move from the retracted position to the extended position along axis O, axis O being substantially parallel to axis of rotation N. Alternatively, forming panel 204f may move from the extended position to the retracted position along axis O.

Placement of forming panel 204 in the retracted position permits first forming members 206 to contact or otherwise receive an extrudate 214. Extrudate 214 may be any continuous extrudate as previously discussed herein, including but not limited to, a multiple rope extrudate (filled or unfilled), a center-filled extrudate, and an extrudate composed of plurality of center-filled ropes. Forming device 200 may receive 1, 2, 3, 5, 10, or 20 or more extrudates, or any number therebetween. Once extrudate 214 is in contact with first forming members 206, forming panel 204 may move to the extended position, as shown by forming panel 204f. In the extended position, forming panel 204 extends over extrudate 214 to substantially cover the extrudate. Forming panel 204g, for example, is in the extended position and covers extrudate 214. In an embodiment, forming panel 204 may be configured so as to avoid contact with extrudate 214 when moving between retracted and extended positions. For example, second forming members 208 of forming panel 204g do not contact extrudate 214 when forming panel 204g is moving between retracted and extended positions. In an embodiment, forming device 200 may include a guideway (not shown) for each extrudate to direct and/or shape the extrudate as it enters the forming device as previously discussed.

In an embodiment, forming device 200 may include a pressing roller 216 that may be adapted or otherwise configured to contact an outer surface of forming panel 204. As rotating drum 202 and forming panels 204 are rotated about axis N, the outer surface of forming panel 204 comes into contact with pressing roller 216. Pressing roller 216 applies a force in the direction of arrow P onto forming panel 204 to move second forming members 208 toward drum 202 and into cooperative engagement with first forming members 206. In other words, the pressing force of pressing roller 216 narrows the gap between first and second forming members 206, 208 to bring forming members 206, 208 into registration or cooperative engagement with each other. Forming members 206, 208 subsequently cooperatively engage extrudate 214 to form separate or individual confectionery pieces 218. It is understood that pieces 218 may be finished confectionery product. It is understood that a center-filled extrudate passing through forming device 200 will yield sealed center-filled individual or separate confectionery pieces.

As rotation continues, forming panel 204 moves out of contact with pressing roller 216. In an embodiment, forming panel 204, alone or in conjunction with drive case 210, may include a spring or similar compressible device that resiliently moves the forming panel away from rotating drum 202 when the forming panel is not in contact with pressing roller 216. Forming panel 204 may then be moved to the retracted position to allow for removal of pieces 218 from forming members 206, 208.

With continued rotation, pieces 218 may be removed from forming members 206, 208 by way of gravity or simply falling or dropping from forming members 206, 208 as indicated by arrow Q in FIG. 12. To reduce adhesion between the forming members 206, 208 and the separate confectionery pieces 218, pieces 218 may be cooled by cooling rotating drum 206 and/or cooling forming panels 204. Cooling may be achieved by passing a chilled or cold fluid through rotating drum 202 and/or forming panels 204 as previously discussed. In addition, forming members 206, 208 may include jets to emit a stream of gas or chilled gas to further assist in the removal of pieces 218 from forming device 200. Of course, an adhesion reducer may be applied to the extrudate prior to entering into the forming device as previously discussed.

Forming device 200 may advantageously operate as a forming device as well as a feeding device. The sequential clamping motion between the forming panels 204 and rotating drum 202 grips extrudate 214 thereby enabling the rotation rate of rotating drum 202 to contribute to, or even dictate, the extrusion rate and/or the feed rate of the extrudate into the forming device. Forming device 200 may be configured to ensure that at least one forming panel (in conjunction with the rotating drum) is in clamped or gripping contact with the extrudate at all times further providing steady, consistent, even feed of extrudate 214 into forming device 200. In an embodiment, the rotation rate of rotating drum 202 (as well as the rotation rate of forming panels 204) may be adjusted as desired to achieve a desired extrusion feed rate. Forming device 200 may receive, crimp and cut a single confectionery rope (filled or unfilled) or a plurality of confectionery ropes (filled or unfilled, adjoined or separate).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A forming device for forming a confectionery product comprising:
   a rotating drum having first forming members disposed on an outer drum surface;
   a forming panel adjacent to and moveable along a length of the outer drum surface, the forming panel having second forming members; and
   the second forming members cooperatively engageable with the first forming members.

2. The forming device of claim 1 wherein the forming panel is rotatable with the rotating drum.

3. The forming device of claim 1 further comprising a plurality of forming panels, the forming panels circumferentially surrounding the outer drum surface.

4. The forming device of claim 1 wherein the forming panel is moveable between a retracted position and an extended position along the length of the rotating drum.

5. The forming device of claim 1 further comprising a pressing roller adapted to contact an outer surface of the forming panel.

6. The forming device of claim 5 wherein contact between the pressing roller and the forming panel moves the forming panel to a forming position, the first and second forming members cooperatively engaging at the forming position.

7. The forming device of claim 1 wherein the first forming members are adapted to receive a confectionery extrudate when the forming panel is in a retracted position.

* * * * *